Dec. 25, 1956 L. R. HIGGINS 2,775,145
SAW SHARPENING MECHANISM
Filed March 10, 1955
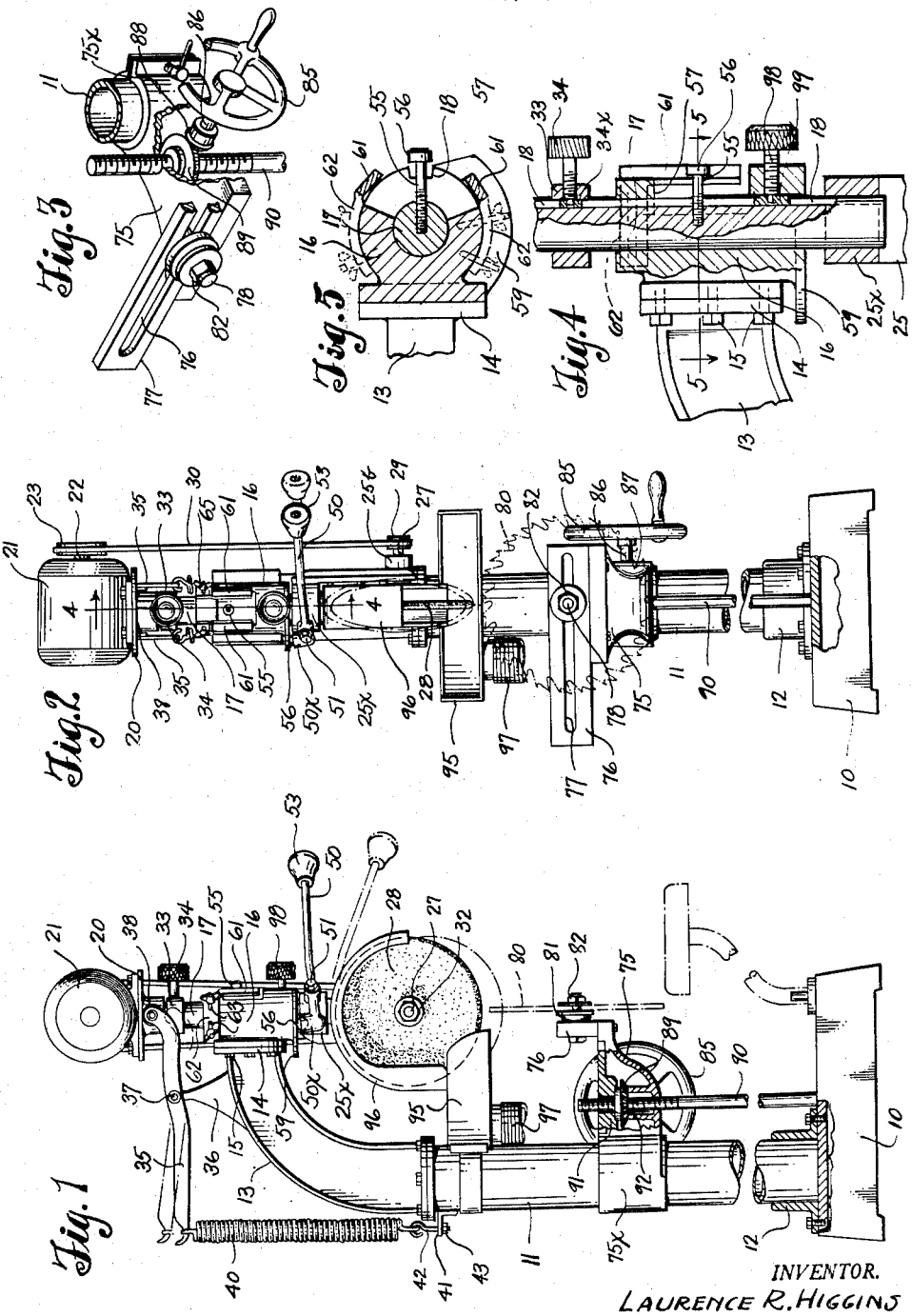
INVENTOR.
LAURENCE R. HIGGINS
BY
Cook & Robinson
ATTORNEYS

United States Patent Office

2,775,145
Patented Dec. 25, 1956

2,775,145

SAW SHARPENING MECHANISM

Laurence R. Higgins, Yakima, Wash., assignor, by decree of distribution, to Florence H. Cast, Kirkland, Wash.

Application March 10, 1955, Serial No. 493,407

7 Claims. (Cl. 76—41)

This invention relates to a mechanism for the sharpening of saws and it has reference more particularly to a mechanism that is especially designed for the sharpening of the teeth or cutters of disk saws, but which also may be used in like manner for the sharpening of the teeth of drag saws or of present day types of chain saws wherein the teeth are arranged at intervals along the chain alternately as "right side" and "left side" cutters.

The present application is a continuation-in-part of my application filed on March 15, 1952, under Serial No. 276,765.

It is the principal object of this invention to provide an improved form of mechanism for sharpening the teeth or cutters of saws of the above kinds; which mechanism is characterized by the provision therein of a support by which the saw sharpening disk is adjustably mounted for movement to and from its various sharpening positions, and is also movable to any of the necessary angular positions relative to the saw being sharpened.

Another object of the invention is to mount the tooth grinding disk for its easy, quick and positive positioning at established angular positions relative to the saw teeth as they are successively presented thereto.

Another object is to provide a mechanism of the above character including a grinding disk and a driving motor for the disk, and to provide supporting means for these parts that are movable as a unit, and to provide counterbalancing means therefor that greatly facilitates the raising, lowering and angular adjustments of the disk that are made to bring the disk into proper grinding contact with the right side or left side cutters for their sharpening.

Still further objects and advantages of the present invention are to be found in the details of construction and combination of parts, and in their mode of operation, as will hereinafter be fully described.

In accomplishing these and other objects of the invention, I have provided the improved details of construction, the preferred forms of which are illustrated in the accompanying drawings, wherein:

Fig. 1 is a side view of a saw sharpening mechanism embodying the improvements of the present invention therein.

Fig. 2 is a front view of the same.

Fig. 3 is a perspective view showing parts of the saw supporting bracket and its adjusting means.

Fig. 4 is an enlarged sectional detail taken on line 4—4 in Fig. 2.

Fig. 5 is a horizontal sectional detail taken substantially on the line 5—5 in Fig. 2.

Referring more in detail to the drawings:

In its present preferred form of construction, the saw sharpening mechanism of this invention comprises a cast metal bed or base member 10 upon which, near its back edge, a tubular standard 11 is rigidly mounted through the mediacy of a flanged collar 12 that is here shown to be bolted to the base member. Fixed to the upper end of the standard, is an upwardly directed and forwardly curving arm or bracket 13, terminating at its upper end in a forwardly facing vertical flange 14. Disposed flatly against the face of the flange 14, and secured thereto by bolts 15 is a vertically directed tubular bearing 16, the lower and upper ends of which terminate slightly below and above the levels of the lower and top edges of the flange 14.

Rotatably and also slidably fitted in the bearing 16 is a vertical shaft 17; this being formed along one side and substantially to its full length with a keyway or channel 18 for a purpose presently explained. The shaft 17 extends at its opposite ends above and below the corresponding ends of the bearing 16. At its upper end it mounts a table or horizontal pad 20 thereon.

Fixedly mounted in horizontal position upon the pad 20, is an electric motor 21 with a drive shaft 22 on which a V-belt pulley wheel 23 is fixed.

That end portion of shaft 17 that extends somewhat below the lower end of the bearing 16 has a downwardly directed bracket fixed thereto; this bracket comprising an arm 25 that is parallel with but laterally offset from the axial line of shaft 17, as shown in Fig. 2. At its upper end, the bracket arm has a mounting lug 25x integral therewith in which the lower end of shaft 17 is fixed, and at its lower end it mounts a bearing 25b in which a horizontal shaft 27 is rotatably mounted. The shaft 27 extends beyond opposite ends of the bearing and at one end has a thin grinding disk 28 fixed thereto and at its other end is equipped with a pulley wheel 29; this being aligned with the pulley wheel 23 on the drive shaft of motor 21. A V-belt 30 operates about the two pulley wheels to rotatably drive the shaft 27 and the grinding disk 28. The disk 28 is fixed against turning on the shaft by a clamp nut 32 tightened thereagainst as seen in Fig. 1. As shown in Figs. 1 and 2, the center of the grinding disk is in the extended axial line of shaft 17 and remains there for all angular as well as up and down adjustments of the disk.

It is a further provision of this invention that the grinding disk 28 and its supporting and driving mechanism be manually set and retained in sharpening position and then when released will be automatically lifted to clear the disk of the tooth or cutter of the saw being sharpened.

To provide for these adjustments, the shaft 17 has longitudinal movement in the bearing 16 between limiting stops. Normally it is yieldingly held in its raised and non-grinding position as seen in full lines in Fig. 1. It is definitely limited at this position when the shaft 17 is moved upwardly by engagement of the mounting lug 25x at the upper end of the bracket 25 against the lower end of the bearing 16. The downward movement of the shaft 17 is limited by a collar 33 that is applied to the shaft and is longitudinally adjustable thereon just below the motor mounting pad 20, and is adapted to be held at any set position of adjustment by a set screw 34 that is threaded through the collar and which has a reduced end portion 34x seated in a key 19 that is slidable in the keyway 18 formed in shaft 17.

Spring means is employed for lifting and yieldingly supporting the grinding disk and its driving means in raised position, and this means has been best shown in Fig. 1 wherein paired, co-extensive and horizontally disposed levers 35 are shown to be pivotally supported at a point between their ends from the upper end of a post or fulcrum member 36 that is formed or fixed on the upper end portion of the arm 13. The levers 35 extend at opposite sides of the member 36 and are pivoted thereto by a horizontal pin 37. At their inner ends, the two levers, which are of equal length, and which extend on opposite sides of the shaft 17 below the pad 20, are equipped with rollers 38 engaged in rolling contact with the underside of the pad 20. At their outer ends the levers are joined and have a hook thereon proving a holding connection with the upper ends of paired coiled springs 40—40 which are secured at their lower ends under tension, to a bracket 41 that is fixed on the upper end of standard 11. The spring tension is such as to slightly more than balance the weight of the shaft 17 and parts fixed thereto, and it operates to lift the same and the disk 28 to non-grinding position when it is manually freed for such movement.

The paired springs are attached at their lower ends to a bolt 42 that extends downwardly through a hole in the bracket 41, and tension on the paired spring can be varied by adjustment of a nut 43 along the bolt. It should be such, however, that downward pull on the shaft is necessary to lower the disk 28 to grinding position.

To effect the lowering movement of the grinding disk 28 from a raised, inactive position to a cutter grinding or tooth sharpening position, and also to effect the rotative adjustment of the shaft 17 that will locate the grinding disk in the correct angular position relative to the saw for the grinding of a "right side" or a "left side" tooth or cutter, or to set it in a neutral position as for depth gauge grinding, I provide a manually operable hand lever mechanism as shown in Figs. 1 and 2. In these views, 50 designates a substantially horizontally directed lever that is pivotally fixed near its inner end, by means of a lag bolt 51, to a front side portion of the mounting lug 25x of bracket 25 as fixed to shaft 17. At its outer end, this lever has a handle or hand hold portion 53, of knob form, and at its inner end has an upwardly directed head portion 50x which mounts a ball bearing 56 in its upper end in such position that it engages in rolling contact with the underside of a flat plate or flange 59 that is formed as a part of or is fixed to the lower end of the bearing 16, to extend outwardly about and along one side of the bearing as noted best in Fig. 5.

It will be understood from the showing in Fig. 1, that downward pull on the outer end of lever 50 will cause the shaft 17 to be pulled downwardly in the bearing 16 and the grinding disk to be lowered accordingly. By moving the grinding disk 28 downwardly, its lower edge portion can be caused to engage in grinding contact with the cutter of a saw that has been properly placed in position for sharpening. When this downward pull is discontinued, the springs 40 will operate, through levers 35 to return the shiftable parts and grinding disk as carried on shaft 17 to raised position and clear of the saw teeth.

It is also understood that, by means of the lever 50, the shaft 17 can be rotatably adjusted in opposite directions from a neutral setting to place the disk 28 at any desired angular position between its opposite limits of adjustment as may be desired or required for the grinding of right side or left side cutters or depth gauges.

As a means for establishing definite angular positions of the grinding disk 28 for sharpening right side and left side cutters or teeth, I have provided adjustable limiting stops, shown best in Figs. 2 and 5, which are adapted to be engaged by a stud 55 that is threaded in a radial direction, into shaft 17 as shown in Fig. 5, to extend forwardly therefrom; this stud preferably being equipped at its outer end with a roller 56. The forward portion of the bearing 16 has been recessed or cut away as noted in 57 in Figs. 4 and 5, to provide the necessary clearance for the stud in the making of rotary and longitudinal adjustments of the shaft 17.

Rotative movements of the shaft 17 in opposite directions for adjusting the grinding disk from a neutral position as seen in Fig. 2, to desired angular settings, are limited by stop bars 61—61 that are fixedly supported from the upper end of bearing 16 to extend downwardly in parallel, spaced relationship at opposite sides of the stud, as in Fig. 5. At their upper ends, these bars are equipped with horizontally extending and arcuately curved arms 62 that are fitted to the curvature of opposite sides of the bearing. These arms are longitudinally slotted, as at 63, and stud bolts 64 are mounted in the bearing and extended outwardly through the slots to mount the stop bars, and wing nuts are threaded onto the studs and adapted to be tightened against the arms to clamp the stop bars in definite and predetermined positions thus serve as stops to be engaged by the stud to establish the angular positions of sharpening the teeth of the saw. To change an adjustment for greater or lesser angles, it is only necessary to loosen the wing nuts and shift the positions of the stops to suit the requirement.

Rotative adjustment of the shaft 17 to either limit as effected by the lever 50, will cause the roller at the end of stud 55 to engage with the inside vertical edge of one of bars 61—61. This establishes the angular portion of the disk. Then by pulling down on the lever, the shaft is caused to move downwardly and this moves the grinding disk accordingly without any change in angle of the disk. The disk can be thus moved downwardly until definitely stopped by the collar 33 engaging the upper end of bearing 16.

For a saw sharpening operation, the selected saw must be held at a definite and predetermined position. For this purpose, I provide a bracket arm 75 that has a split mounting collar 75x at one end slidably fitted for adjustment along the standard 11 and adapted to be clamped thereabout to hold the setting. At its outer or forward end, the arm 75 rigidly supports a transversely directed and horizontal bar 76 formed with a longitudinal slot 77 through which a bolt 78 extends for the mounting of a saw. In Figs. 1 and 2, I have designated a disk saw at 80, and as mounted on the bolt, and held secure thereon between a flanged collar 81 and a clamping nut 82. These parts hold the saw disk aligned with the center of the disk 28 in proper position for sharpening.

The proper elevational adjustment of the arm 75, to locate the saw which is to be sharpened at a proper elevation relative to the lower limit of movement of the grinding disk, is effected by turning of a hand wheel 85 which is fixed to a horizontal supporting shaft 86, that is rotatably mounted in a bearing 87 formed in the arm, to extend to one side thereof. At its inner end the shaft 86 has a beveled pinion 88 fixed thereon. This meshes with a bevel gear 89 that is threaded on a vertical shaft 90 that is fixed at its lower end in the base 10 and extends upwardly therefrom and slidably through the arm 75. The gear 89 is held rotatably between upper and lower bearings 91—92 on the arm, as noted in Fig. 1. Thus, when the gear 89 is rotated, it moves up or down on the fixed shaft 90 and adjusts the elevation of the bracket 75 on standard 11 accordingly.

Grindings from the operation are adapted to be received from the disk by a catch pan 95 supported from the standard as shown in Fig. 1; being guided into the pan by a guard 96 that is applied about the top and back of the peripheral portion of the disk and supported from the bracket 25. A suction tube, as at 97 opens into the base of the pan to carry off the grindings.

Assuming that the parts are so assembled, the use of the device for sharpening a disk saw is as follows: First, the saw is mounted on the bolt 78 as carried in bar 76 and the bolt adjusted along the slot 77 to place the saw in a desired position relative to the axial line of shaft 17, and then the bolt is fixed against movement. The end limits for the oscillating movements of the grinding disk are then established by a proper setting of the bars 61—61. Then the limit of downward travel of shaft 17 is established by a proper setting of collar 33 on shaft 17 and its fixed securement by tightening the set screw 34.

With adjustments made, and the disk 28 being driven by motor 21, the operator pulls down on lever 50, thus to cause the disk to be brought down, as to the dotted line position of Fig. 1, and by this movement to sharpen the tooth to proper depth and at proper angle. Then the saw is adjusted to bring the next tooth in position, and the disk swung to an opposite angle, if the tooth is on the opposite side of the disk. This operation is repeated for successive teeth until once around the disk.

If "straight across" grinding is desired, the shaft 17 may be held in a neutral setting by a set screw 98 that is threaded into the bearing 16 as seen in Fig. 1 and which is adapted to holdingly engage with a key 99 that is slidable in the shaft channel 18 in the same manner as the key 34x is shown in Fig. 5.

If a chain saw is to be sharpened, the same mode of operation is followed. However, a suitable support for the chain is applied to the bar 76 in lieu of the bolt 78. The right and left cutters are sharpened by alternately adjusting the disk to opposite angular limits.

The present invention is characterized by the fact that either a disk saw or chain saw can be completely sharpened by going once around it. This is made possible only because of the provision for the oscillating of the saw to the different angular positions. The grinding disk is manually adjusted to grinding position, and when the lever 50 is released, will outwardly return to a non-sharpening position. Adjustments are easily and very readily made and the operation can be carried on speedily and satisfactorily.

Having thus described my invention, what I claim as new therein and desire to secure by Letters Patent is:

1. In a saw sharpening means, a frame structure, means therein for the support of a saw in a set position for the advancement of its cutting elements successively to a position for sharpening, a bearing fixed in the frame structure, above the saw supporting means, a shaft mounted vertically in said bearing for longitudinal and rotary adjustments, a motor supported by and movable with the shaft, an arbor supported from the lower end portion of the shaft, a grinding disk fixed on the arbor, means effecting a driving connection between motor and arbor, yieldable means acting against the said shaft to lift and normally hold it in an elevated position of adjustment at which the grinding disk will be clear of the saw, and a lever pivotally fixed to the shaft and extended outwardly therefrom as a handle for effecting its rotary adjustment in opposite directions to change and establish the working angles of the grinding disk relative to the saw; a plate secured to the lower end of the bearing and said lever being engageable at its inner end with said plate for effecting downward adjustment of the shaft against the resistance of said yieldable means to engage the disk with the saw for a cutter sharpening operation.

2. A combination as recited in claim 1 wherein stop means are applied to the shaft for engagement with upper and lower ends of said bearing to definitely limit the extent of upward and downward travel of said shaft in said bearing.

3. A combination as recited in claim 1 wherein stop means are applied to the shaft for engagement with upper and lower ends of said bearing to definitely limit the up and down travel of said shaft in said bearing, a stud member fixed on the shaft and extended outwardly therefrom, and stops adjustably fixed to the bearing at opposite sides of said stud, and engageable by the stud to limit the extent of the rotary adjustments of the shaft in opposite directions from a neutral setting.

4. In a saw sharpening means; a frame structure, means therein for support of a saw in a set position, permitting the successive advancement of its cutting elements to a position for sharpening, a bearing fixed in the frame structure above the means for the support of a saw, a shaft mounted vertically in said bearing for longitudinal and rotary adjustment and extended above and below the bearing, a pad fixedly mounted on the upper end of the shaft, a motor fixedly mounted on said pad, a bracket fixed to the lower end of the shaft, an arbor mounted horizontally by the bracket at the lower end of the shaft, means effecting a driving connection between motor and arbor, a grinding disk mounted on the arbor and centered in the axial line of said shaft, spring means acting upwardly against the shaft to move it to and yieldingly support it at an elevated position at which said grinding disk is held clear of and above a saw as applied to the machine for sharpening, and a hand lever pivotally supported from the shaft at a point below the bearing and extended outwardly therefrom as a handle for effecting rotary adjustments of the shaft to change and establish the working angles of the disk relative to a supporting saw, a plate secured to the lower end of the bearing and said lever being engageable at its inner end with said plate for adjustment of the shaft downwardly to engage the disk with the saw for a cutter sharpening operation.

5. A combination as in claim 4 wherein said spring means comprises a fulcrum lever that is pivoted between its ends on said frame structure with one end of the fulcrum lever in supporting and lifting contact with the pad, a spring attached under tension to said frame and to the other end of the fulcrum lever to normally yieldingly retain the disk out of sharpening contact with the saw and yieldable for its manual adjustment to sharpening position by said lever.

6. A device as in claim 5 wherein said fulcrum lever has a roller at its inner end engaged in rolling contact with the under surface of said pad.

7. A combination as recited in claim 4 wherein a collar is applied adjustably about the upper end portion of the shaft to engage with the upper end of said bearing to limit the downward adjustment of the grinding disk as supported from said shaft, and wherein a stud is fixed in the shaft to extend outwardly therefrom, and stops are adjustably fixed to the bearing and extended parallel with the shaft along opposite sides of the stud to limit the rotative adjustments of the shaft in opposite directions to establish the working angles of the grinding disk relative to the saw.

References Cited in the file of this patent
UNITED STATES PATENTS
2,615,354   Higgins _____ Oct. 28, 1952